United States Patent
Heeke

(10) Patent No.: US 8,240,441 B2
(45) Date of Patent: Aug. 14, 2012

(54) HYDRODYNAMIC COUPLING DEVICE FOR HYBRID VEHICLES

(75) Inventor: Gregory A. Heeke, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1021 days.

(21) Appl. No.: 12/214,021

(22) Filed: Jun. 16, 2008

(65) Prior Publication Data

US 2009/0054203 A1   Feb. 26, 2009

Related U.S. Application Data

(60) Provisional application No. 60/936,443, filed on Jun. 20, 2007.

(51) Int. Cl.
   *F16D 25/10*   (2006.01)
(52) U.S. Cl. .................................. 192/3.25; 192/48.611
(58) Field of Classification Search ................. 192/3.25, 192/3.26, 3.27, 48.609, 85.35, 3.21
   See application file for complete search history.

(56) References Cited

U.S. PATENT DOCUMENTS

| | | | | |
|---|---|---|---|---|
| 1,689,244 A | * | 10/1928 | Klimek | 192/3.21 |
| 2,071,589 A | * | 2/1937 | Swennes | 192/3.21 |
| 2,229,319 A | * | 1/1941 | Wesselhoff | 192/3.21 |
| 2,309,413 A | * | 1/1943 | Neracher et al. | 192/3.26 |
| 2,700,444 A | * | 1/1955 | Ahlen | 192/89.23 |
| 2,707,539 A | * | 5/1955 | Marble | 192/3.26 |
| 2,828,651 A | * | 4/1958 | Duffield | 192/3.26 |
| 3,160,253 A | * | 12/1964 | Maurice | 192/89.23 |
| 3,517,789 A | * | 6/1970 | Gimmler et al. | 192/3.21 |
| 3,625,323 A | * | 12/1971 | Hetmann | 192/3.26 |
| 5,129,493 A | * | 7/1992 | Edmunds | 192/3.21 |
| 5,789,823 A | | 8/1998 | Sherman | |

FOREIGN PATENT DOCUMENTS

| DE | 10048843 A1 | 4/2001 |
|---|---|---|
| WO | WO 02/100672 A1 | 12/2002 |

* cited by examiner

*Primary Examiner* — Rodney Bonck
(74) *Attorney, Agent, or Firm* — Simpson & Simpson, PLLC

(57) ABSTRACT

A hydrodynamic coupling device including: a housing; a sealing plate rotationally connected to the housing; a pump disposed within the housing; a turbine disposed within the housing and in fluid communication with the pump; and a dry chamber at least partially enclosed by the housing and the sealing plate. A hydrodynamic coupling device including: a housing; an electric motor rotationally connected to the housing; and a fluid coupling including a pump rotationally connected to the housing and a turbine rotationally connected to an output hub. The fluid coupling does not include a stator. A hydrodynamic coupling device including a space formed between a stator shaft and a pump hub and a sleeve disposed in the space. The sleeve divides the space into first and second channels.

4 Claims, 10 Drawing Sheets

HYDRODYNAMIC COUPLING DEVICE FOR HYBRID VEHICLES

CROSS-REFERENCE TO RELATED APPLICATIONS

This application claims the benefit under 35 U.S.C. §119(e) of U.S. Provisional Application No. 60/936,443 filed on Jun. 20, 2007 which application is incorporated herein by reference.

FIELD OF THE INVENTION

The invention relates generally to hydrodynamic torque transmission devices, and more specifically to a hydrodynamic coupling device for hybrid applications.

BACKGROUND OF THE INVENTION

FIG. 1 illustrates a general block diagram showing the relationship of the engine 7, torque converter 10, transmission 8, and differential/axle assembly 9 in a typical vehicle. It is well known that a torque converter is used to transmit torque from an engine to a transmission of a motor vehicle.

The three main components of the torque converter are the pump 37, turbine 38, and stator 39. The torque converter becomes a sealed chamber when the pump is welded to cover 11. The cover is connected to flexplate 41 which is, in turn, bolted to crankshaft 42 of engine 7. The cover can be connected to the flexplate using lugs or studs welded to the cover. The welded connection between the pump and cover transmits engine torque to the pump. Therefore, the pump always rotates at engine speed. The function of the pump is to use this rotational motion to propel the fluid radially outward and axially towards the turbine. Therefore, the pump is a centrifugal pump propelling fluid from a small radial inlet to a large radial outlet, increasing the energy in the fluid. Pressure to engage transmission clutches and the torque converter clutch is supplied by an additional pump in the transmission that is driven by the pump hub.

In torque converter 10 a fluid circuit is created by the pump (sometimes called an impeller), the turbine, and the stator (sometimes called a reactor). The fluid circuit allows the engine to continue rotating when the vehicle is stopped, and accelerate the vehicle when desired by a driver. The torque converter supplements engine torque through torque ratio, similar to a gear reduction. Torque ratio is the ratio of output torque to input torque. Torque ratio is highest at low or no turbine rotational speed (also called stall). Stall torque ratios are typically within a range of 1.8-2.2. This means that the output torque of the torque converter is 1.8-2.2 times greater than the input torque. Output speed, however, is much lower than input speed, because the turbine is connected to the output and it is not rotating, but the input is rotating at engine speed.

Turbine 38 uses the fluid energy it receives from pump 37 to propel the vehicle. Turbine shell 22 is connected to turbine hub 19. Turbine hub 19 uses a spline connection to transmit turbine torque to transmission input shaft 43. The input shaft is connected to the wheels of the vehicle through gears and shafts in transmission 8 and axle differential 9. The force of the fluid impacting the turbine blades is output from the turbine as torque. Axial thrust bearings 31 support the components from axial forces imparted by the fluid. When output torque is sufficient to overcome the inertia of the vehicle at rest, the vehicle begins to move.

After the fluid energy is converted to torque by the turbine, there is still some energy left in the fluid. The fluid exiting from small radial outlet 44 would ordinarily enter the pump in such a manner as to oppose the rotation of the pump. Stator 39 is used to redirect the fluid to help accelerate the pump, thereby increasing torque ratio. Stator 39 is connected to stator shaft 45 through one-way clutch 46. The stator shaft is connected to transmission housing 47 and does not rotate. One-way clutch 46 prevents stator 39 from rotating at low speed ratios (where the pump is spinning faster than the turbine). Fluid entering stator 39 from turbine outlet 44 is turned by stator blades 48 to enter pump 37 in the direction of rotation.

The blade inlet and exit angles, the pump and turbine shell shapes, and the overall diameter of the torque converter influence its performance. Design parameters include the torque ratio, efficiency, and ability of the torque converter to absorb engine torque without allowing the engine to "run away." This occurs if the torque converter is too small and the pump can't slow the engine.

At low speed ratios, the torque converter works well to allow the engine to rotate while the vehicle is stationary, and to supplement engine torque for increased performance. At speed ratios less than 1, the torque converter is less than 100% efficient. The torque ratio of the torque converter gradually reduces from a high of about 1.8 to 2.2, to a torque ratio of about 1 as the turbine rotational speed approaches the pump rotational speed. The speed ratio when the torque ratio reaches 1 is called the coupling point. At this point, the fluid entering the stator no longer needs redirected, and the one way clutch in the stator allows it to rotate in the same direction as the pump and turbine. Because the stator is not redirecting the fluid, torque output from the torque converter is the same as torque input. The entire fluid circuit will rotate as a unit.

Peak torque converter efficiency is limited to 92-93% based on losses in the fluid. Therefore torque converter clutch 49 is employed to mechanically connect the torque converter input to the output, improving efficiency to 100%. Clutch piston plate 17 is hydraulically applied when commanded by the transmission controller. Piston plate 17 is sealed to turbine hub 19 at its inner diameter by o-ring 18 and to cover 11 at its outer diameter by friction material ring 51. These seals create a pressure chamber and force piston plate 17 into engagement with cover 11. This mechanical connection bypasses the torque converter fluid circuit.

The mechanical connection of torque converter clutch 49 transmits many more engine torsional fluctuations to the drivetrain. As the drivetrain is basically a spring-mass system, torsional fluctuations from the engine can excite natural frequencies of the system. A damper is employed to shift the drivetrain natural frequencies out of the driving range. The damper includes springs 15 in series with engine 7 and transmission 8 to lower the effective spring rate of the system, thereby lowering the natural frequency.

Torque converter clutch 49 generally comprises four components: piston plate 17, cover plates 12 and 16, springs 15, and flange 13. Cover plates 12 and 16 transmit torque from piston plate 17 to compression springs 15. Cover plate wings 52 are formed around springs 15 for axial retention. Torque from piston plate 17 is transmitted to cover plates 12 and 16 through a riveted connection. Cover plates 12 and 16 impart torque to compression springs 15 by contact with an edge of a spring window. Both cover plates work in combination to support the spring on both sides of the spring center axis. Spring force is transmitted to flange 13 by contact with a flange spring window edge. Sometimes the flange also has a rotational tab or slot which engages a portion of the cover plate to prevent over-compression of the springs during high torque events. Torque from flange 13 is transmitted to turbine hub 19 and into transmission input shaft 43.

Energy absorption can be accomplished through friction, sometimes called hysteresis, if desired. Hysteresis includes friction from windup and unwinding of the damper plates, so it is twice the actual friction torque. The hysteresis package generally consists of diaphragm (or Belleville) spring 14 which is placed between flange 13 and one of cover plates 16 to urge flange 13 into contact with the other cover plate 12. By controlling the amount of force exerted by diaphragm spring 14, the amount of friction torque can also be controlled. Typical hysteresis values are in the range of 10-30 Nm.

Hybrid drive trains incorporate an electric motor in addition to the engine to propel the vehicle. U.S. Pat. No. 5,789, 823 includes an electric motor with a torque converter. However, this arrangement requires an additional one-way clutch and five fluid passages for clutch actuation. European Patent Application No. 1 395 454 and German Patent Application No. 100 48 843 disclose inventions which couple the electric motor to the engine directly, resulting in decreased efficiency during regenerative braking.

Thus, there is a long-felt need for a hydrodynamic coupling device for hybrid vehicles with reduced complexity. There is also a need for a hydrodynamic coupling device for hybrid vehicles with increased efficiency during regenerative braking.

BRIEF SUMMARY OF THE INVENTION

The present invention broadly comprises a hydrodynamic coupling device including: a housing; a sealing plate rotationally connected to the housing; a pump disposed within the housing; a turbine disposed within the housing and in fluid communication with the pump; and a dry chamber at least partially enclosed by the housing and the sealing plate. In a first embodiment, the device includes a damper disposed in the dry chamber. In a second embodiment, the device includes a first clutch arranged to drivingly engage the cover to a pilot shaft, and the first clutch includes a diaphragm spring and is disposed in the dry chamber. In a third embodiment, the device includes a piston cup arranged to displace the diaphragm spring to control operation of the first clutch, and the piston cup at least partially encloses the dry chamber. The piston cup and the sealing plate are rotationally fixed during operation of the coupling device. In a fourth embodiment, the device includes a second clutch arranged to drivingly engage the turbine to the housing; and first and second fluid chambers. Fluid pressures in the first and second fluid chambers are independently controllable to operate the second clutch and the piston cup, respectively. In a firth embodiment, the device includes a torque converter including the pump and the turbine and an electric motor with a rotor connected to the housing.

The present invention also broadly comprises a hydrodynamic coupling device including: a housing; an electric motor rotationally connected to the housing; and a fluid coupling including a pump rotationally connected to the housing and a turbine rotationally connected to an output hub. The fluid coupling does not include a stator. In a first embodiment, the device includes a first clutch rotationally connected to the housing and to the turbine; a second clutch disposed in a torque path from a lug plate and the housing; and first and second fluid chambers. Fluid pressures in the first and second chambers are independently controllable to operate the first and a second clutches, respectively. In a second embodiment, the device includes a damper disposed in the torque path.

The present invention further broadly comprises a hydrodynamic coupling device including: a housing; an electric motor rotationally connected to the housing; a pump disposed in the housing and rotationally connected to the housing; and a turbine disposed in the housing and in fluid communication with the pump. The device is arranged for disposition in a transmission housing, when disposed in the transmission housing, the housing forms a portion of a fluid chamber with the transmission housing, and the electric motor is disposed within the fluid chamber. In a first embodiment, the device includes a first clutch rotationally connected to the housing and to the turbine; a second clutch disposed in a torque path from a lug plate and the housing; and first and second fluid chambers. Fluid pressures in the first and second chambers are independently controllable to operate the first and a second clutches, respectively. In a second embodiment, the device includes a damper disposed in the torque path.

The present invention yet further broadly comprises a hydrodynamic coupling device including: a housing; an electric motor rotationally connected to the housing; a pump disposed in the housing and rotationally connected to the housing; and a turbine disposed in the housing and in fluid communication with the pump; a plate; and a bearing in contact with the plate and the housing. The device is arranged for disposition in a transmission housing and when disposed in the transmission housing, the plate is connected to the transmission housing and the housing is radially centered by the bearing. In a first embodiment, the device includes a first clutch rotationally connected to the housing and to the turbine; a second clutch disposed in a torque path from a lug plate and the housing; and first and second fluid chambers. Fluid pressures in the first and second chambers are independently controllable to operate the first and a second clutches, respectively. In a second embodiment, the device includes a damper disposed in the torque path.

As well, the present invention broadly comprises a hydrodynamic coupling device including: a housing; an electric motor rotationally connected to the housing; a pump disposed in the housing and rotationally connected to the housing; a turbine disposed in the housing and in fluid communication with the pump; and a damper rotationally connected to the housing and disposed outside the housing. A spring for the damper is restrained by first and second separate plates and the housing. In a first embodiment, the device includes a lug plate and wherein the damper is disposed in a torque path between the lug plate and the housing. In a second embodiment, the device includes a first clutch rotationally connected to the turbine and in a torque path from the housing to the turbine; a second clutch rotationally connected to the housing and to the pump; and first and second fluid chambers. Fluid pressures in the first and second chambers are independently controllable to operate the first and a second clutches, respectively. In a third embodiment, the device includes a torque converter including the pump and the turbine.

Further, the present invention broadly comprises a hydrodynamic coupling device including a space formed between a stator shaft and a pump hub and a sleeve disposed in the space. The sleeve divides the space into first and second channels. In a first embodiment, the device includes a housing; an electric motor rotationally connected to the housing; a torque converter disposed in the housing and including a turbine and a pump; and a first clutch rotationally connected to the housing and the pump and controllable by respective fluid pressures in first and second fluid chambers. The first channel is arranged to control fluid pressure in the first fluid chamber and the second channel is arranged to drain fluid disposed between seals for the first fluid chamber.

Further still, the present invention broadly comprises a hydrodynamic coupling device including: a housing; an electric motor rotationally connected to the housing; a pump disposed in the housing; a turbine disposed in the housing and including a turbine shell; a first clutch including a pressure plate rotationally connected to the turbine shell, a seal between the turbine shell and the pressure plate, a clutch plate rotationally connected to the pressure plate, a piston plate, and a drive plate connected to the piston plate; and first and second chambers. The seal at least partially separates the first and second chambers and respective fluid pressures in the first and second chambers are controllable to operate the first clutch. In a first embodiment, the device includes a damper rotationally connected to the housing and disposed outside the housing; and a lug plate. The damper includes first and second separate plates restraining, with respect to the housing, a spring for the damper and the damper is disposed in a torque path between the lug plate and the housing. In a second embodiment, the device includes a second clutch rotationally connected to the housing and to the pump; and a third chamber. Fluid pressure in the third chamber at least partly controls operation of the second clutch and the first and third chambers are in fluid isolation.

The present invention also broadly comprises a method for operating a hydrodynamic coupling device including a housing, an electric motor rotationally connected to the housing, a pump disposed in the housing, a turbine disposed in the housing and including a turbine shell, and a clutch rotationally connected to a housing and the pump, including the steps of: dividing a spaced formed between a stator shaft and a pump hub into first and second separate channels; controlling fluid pressure in first and second chambers for the clutch via the first and second channels, respectively; and lowering pressure in the first chamber to close the clutch.

The present invention further broadly comprises a method for assembling a hydrodynamic coupling device including the steps of: rotationally connecting an electric motor to a housing; disposing a pump and a turbine in the housing; disposing first and second clutches in the housing, the first clutch connecting the housing and the pump and the second pump connecting the turbine and the housing; connecting a cover to the housing; disposing a damper spring and flange in a space formed by the housing and the cover; and fixedly securing a plate to the cover such that the plate retains the spring with respect to the cover and the housing.

It is a general object of the present invention to provide a hydrodynamic coupling device for hybrid vehicles with reduced complexity.

This and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural element of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 7A:
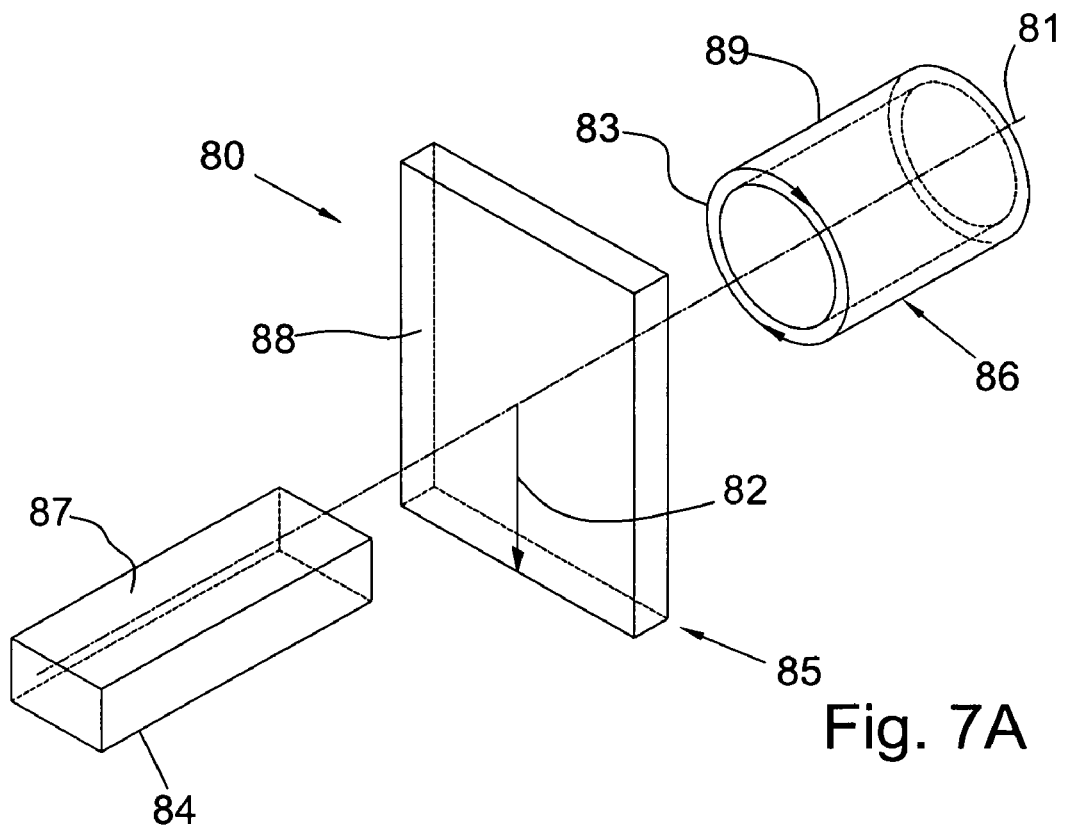
FIG. 7A is a perspective view of a cylindrical coordinate system demonstrating spatial terminology used in the present application.

FIG. 7A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1:
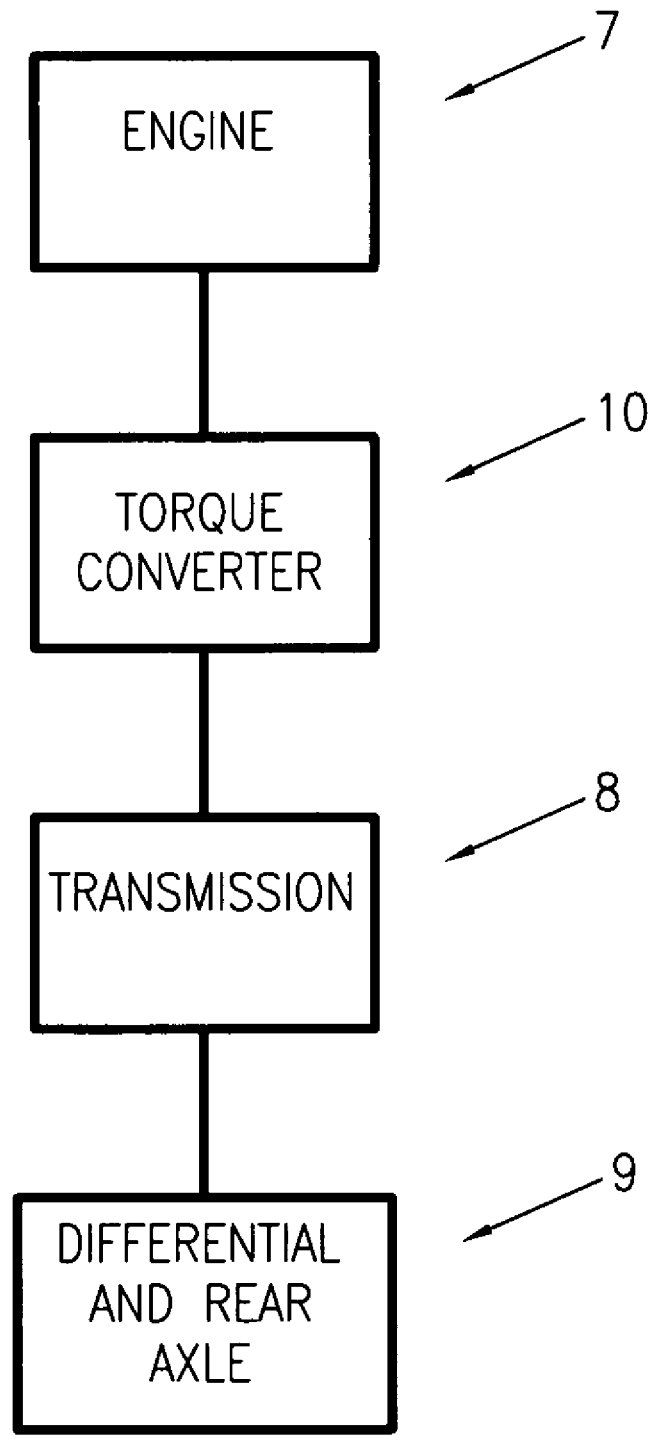
FIG. 1 is a general block diagram illustration of power flow in a motor vehicle, intended to help explain the relationship and function of a torque converter in the drive train thereof.
Figure 2:
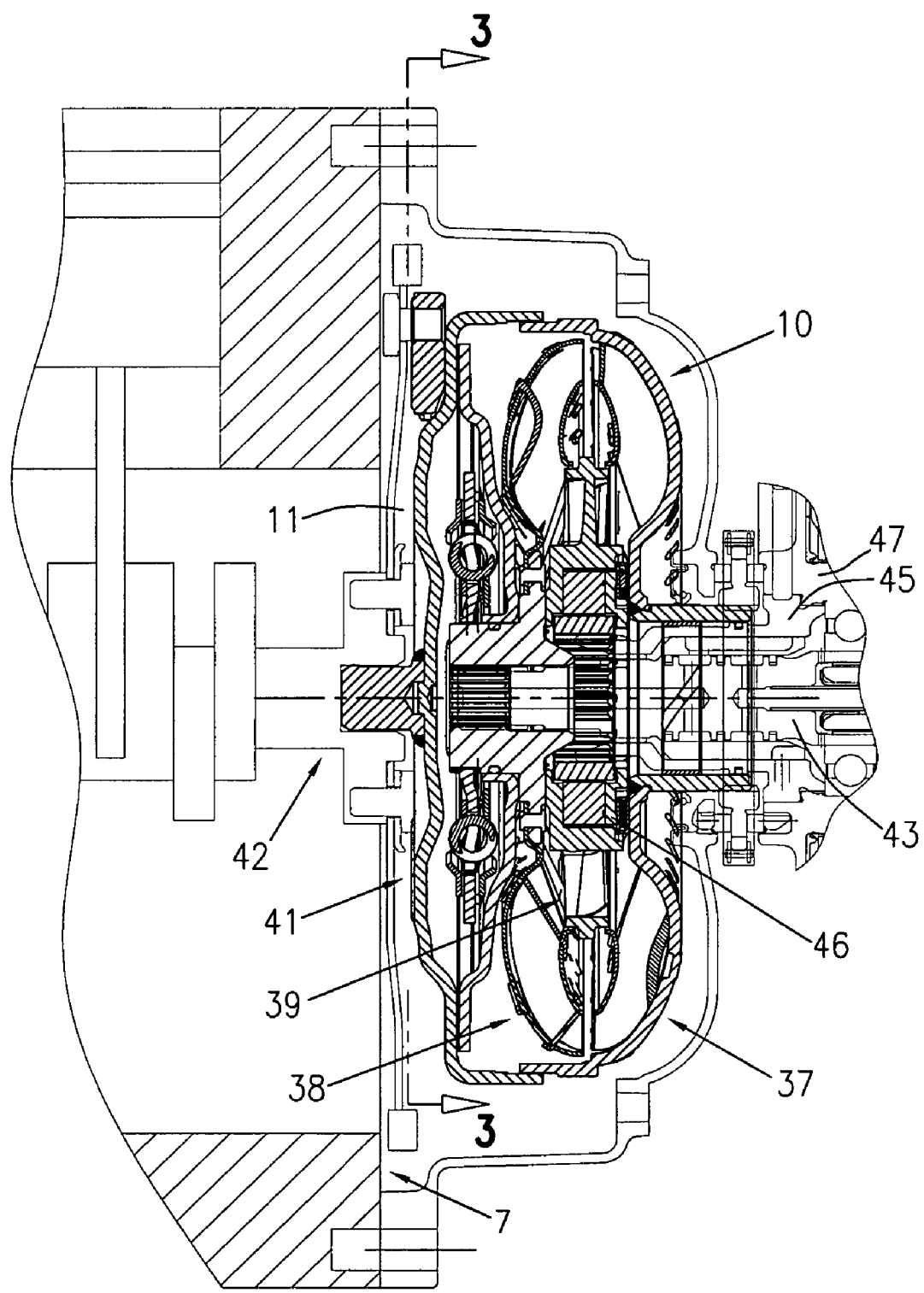
FIG. 2 is a cross-sectional view of a prior art torque converter, shown secured to an engine of a motor vehicle.
Figure 3:
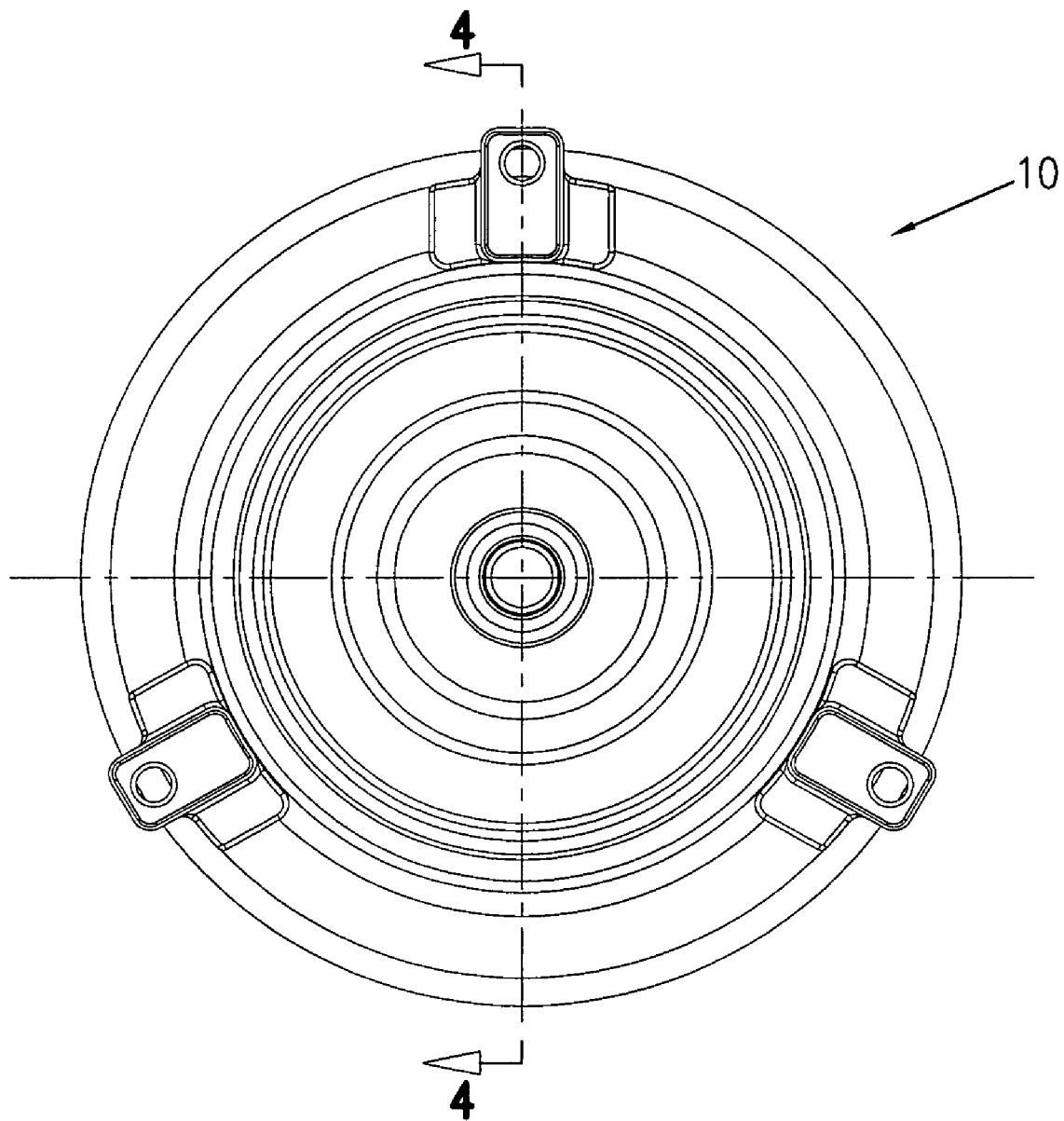
FIG. 3 is a left view of the torque converter shown in FIG. 2, taken generally along line 3-3 in FIG. 2.
Figure 4:
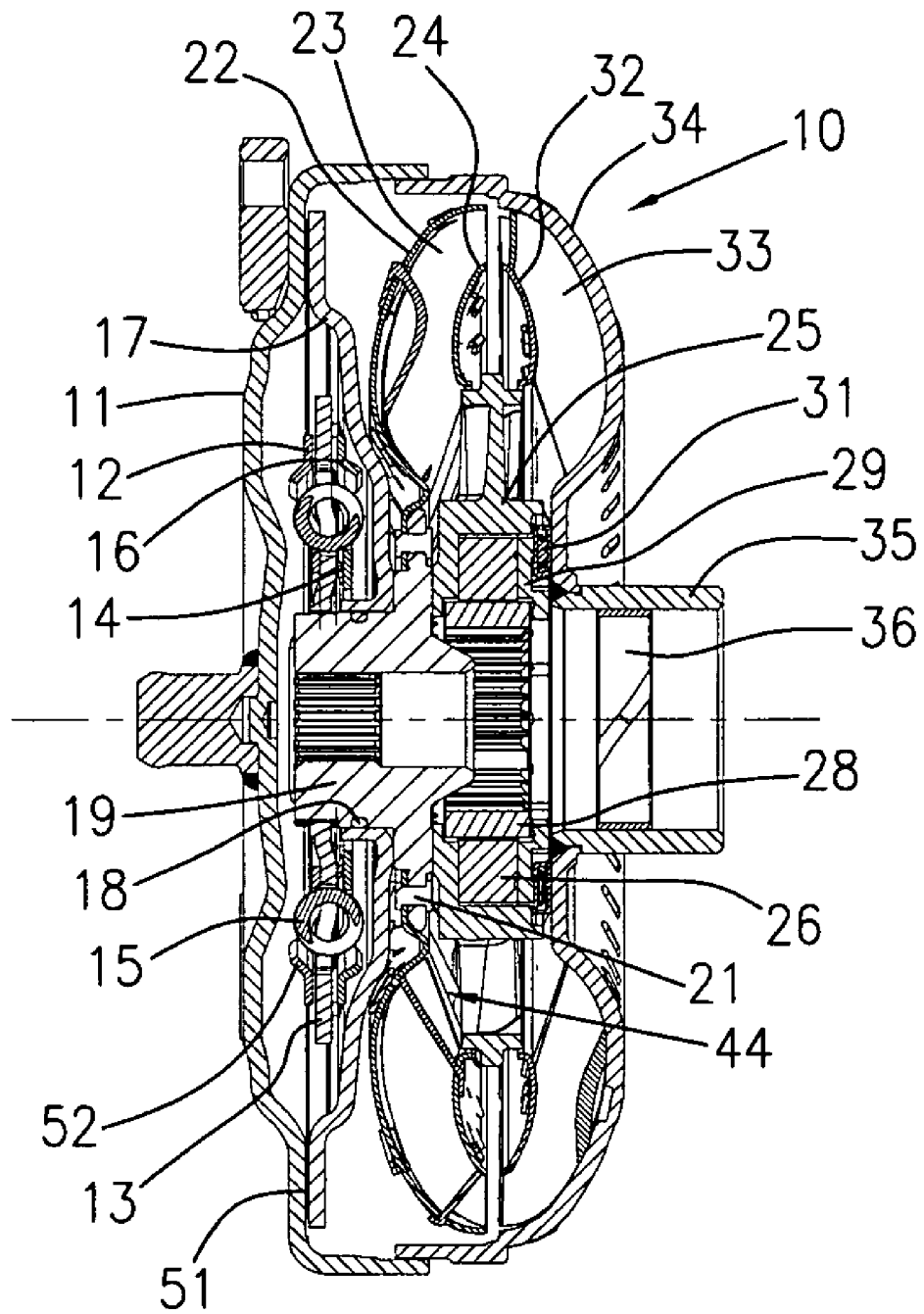
FIG. 4 is a cross-sectional view of the torque converter shown in FIGS. 2 and 3, taken generally along line 4-4 in FIG. 3.
Figure 5:
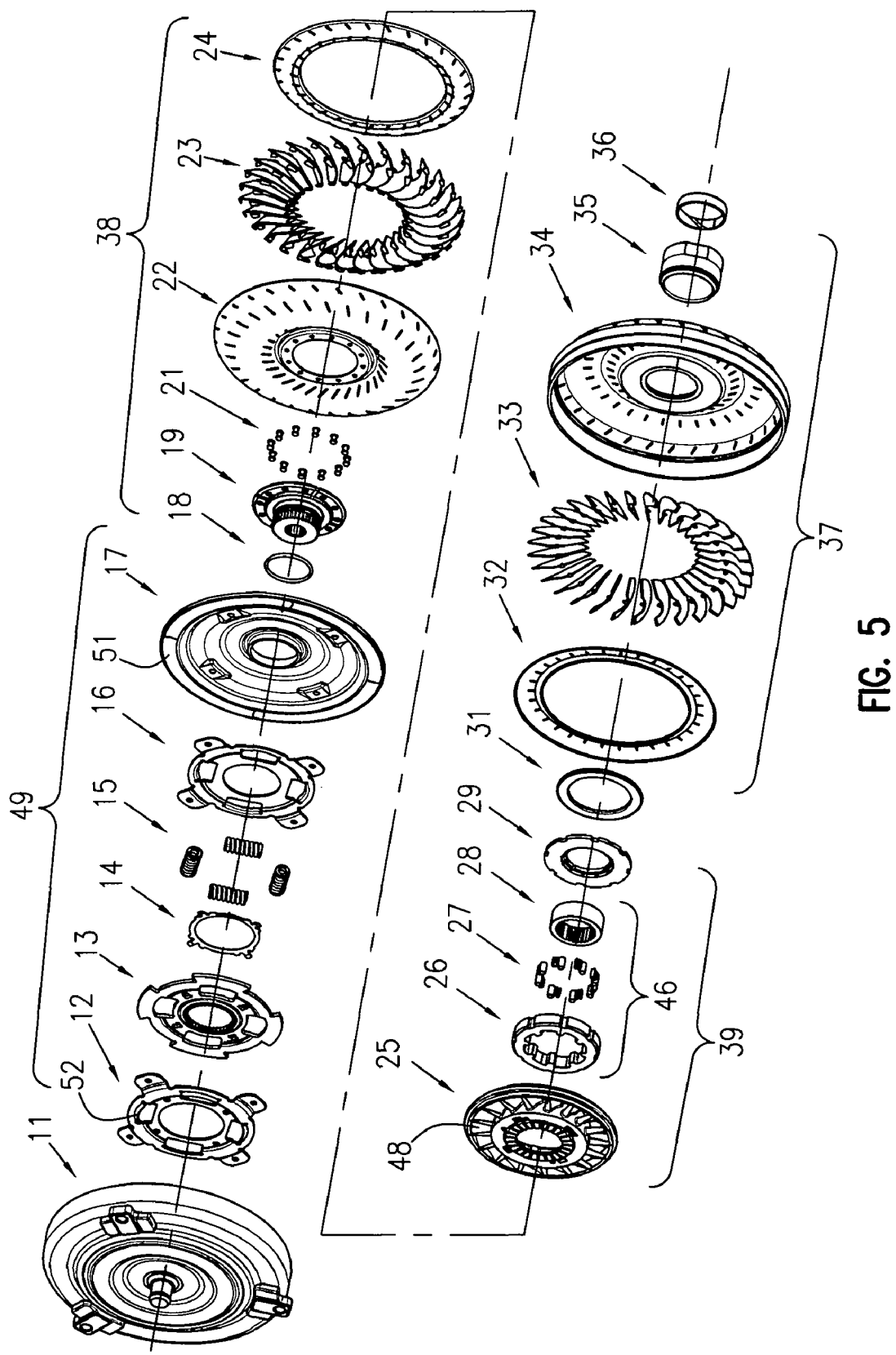
FIG. 5 is a first exploded view of the torque converter shown in FIG. 2, as shown from the perspective of one viewing the exploded torque converter from the left.
Figure 6:
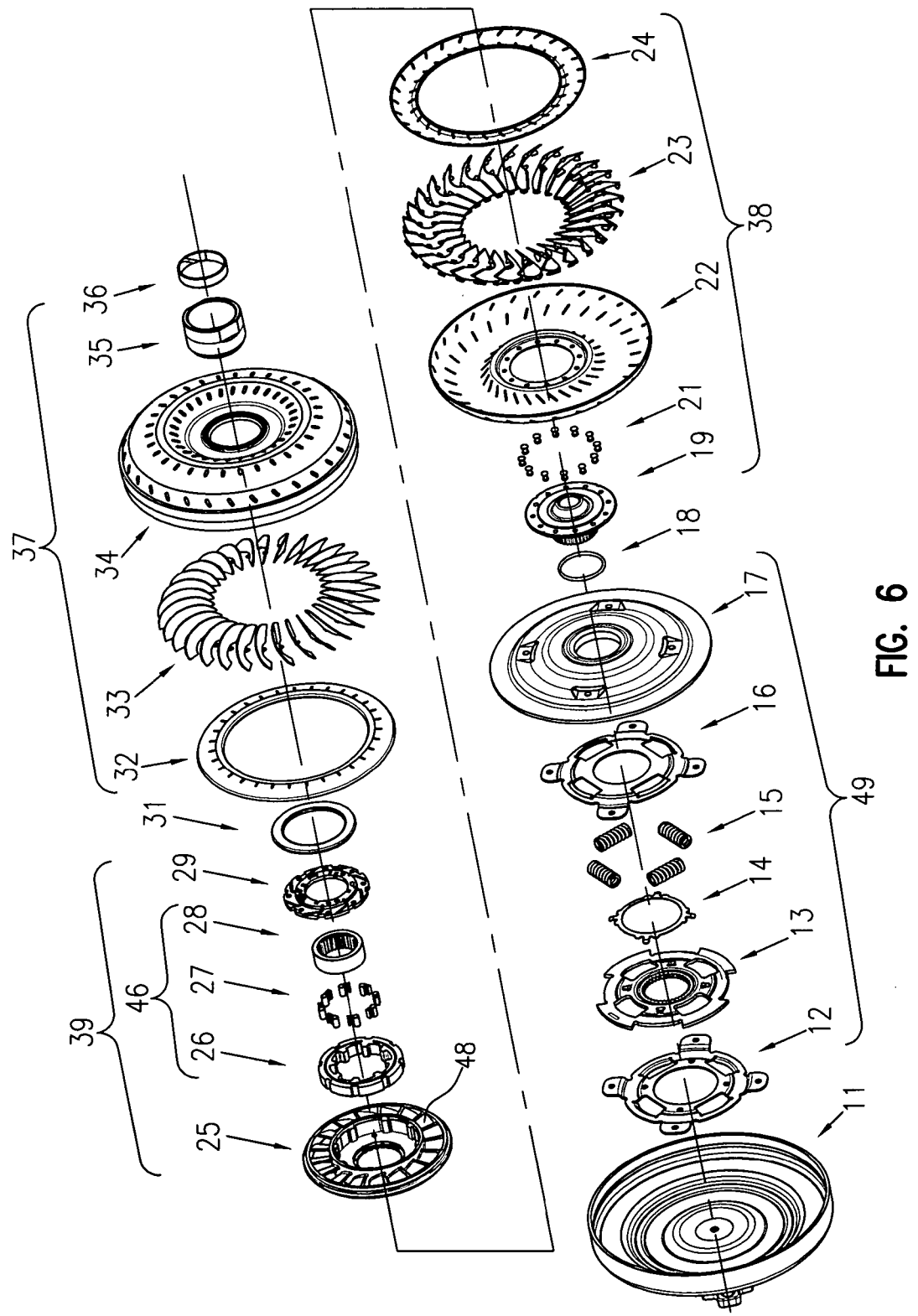
FIG. 6 is a second exploded view of the torque converter shown in FIG. 2, as shown from the perspective of one viewing the exploded torque converter from the right.
Figure 7B:
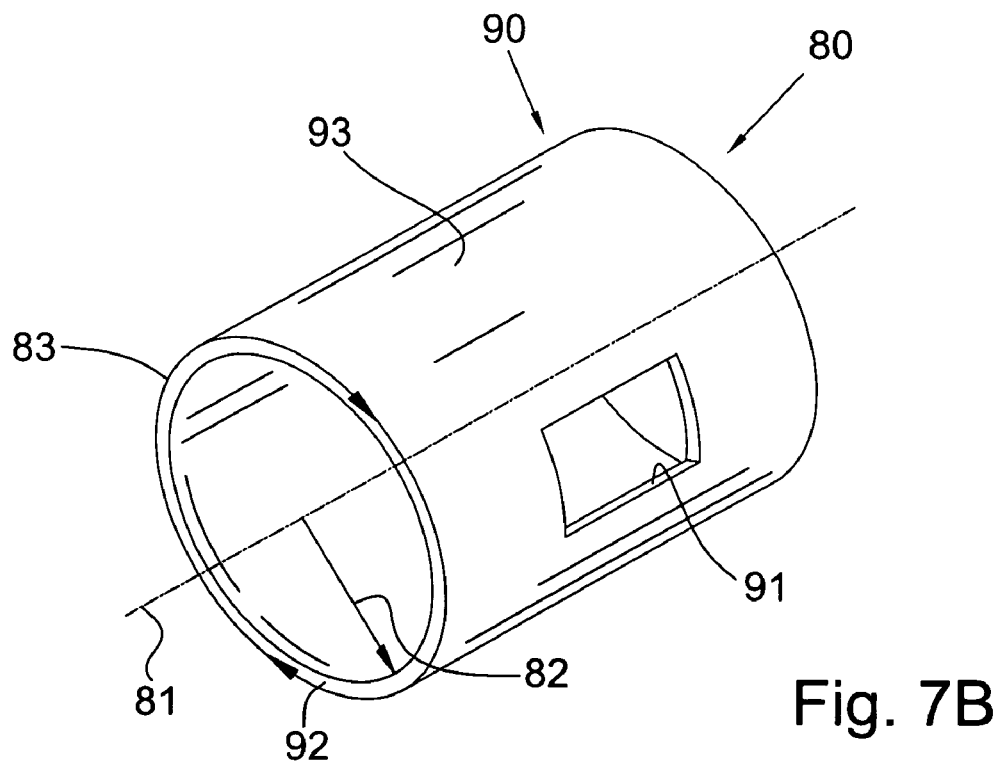
FIG. 7B is a perspective view of an object in the cylindrical coordinate system of FIG. 7A demonstrating spatial terminology used in the present application.

FIG. 7B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention is any manner. Object 90 includes axial surface 91, radial surface 92, and circumferential surface 93. Surface 91 is part of an axial plane, surface 92 is part of a radial plane, and surface 93 is part of a circumferential plane.

Figure 8:
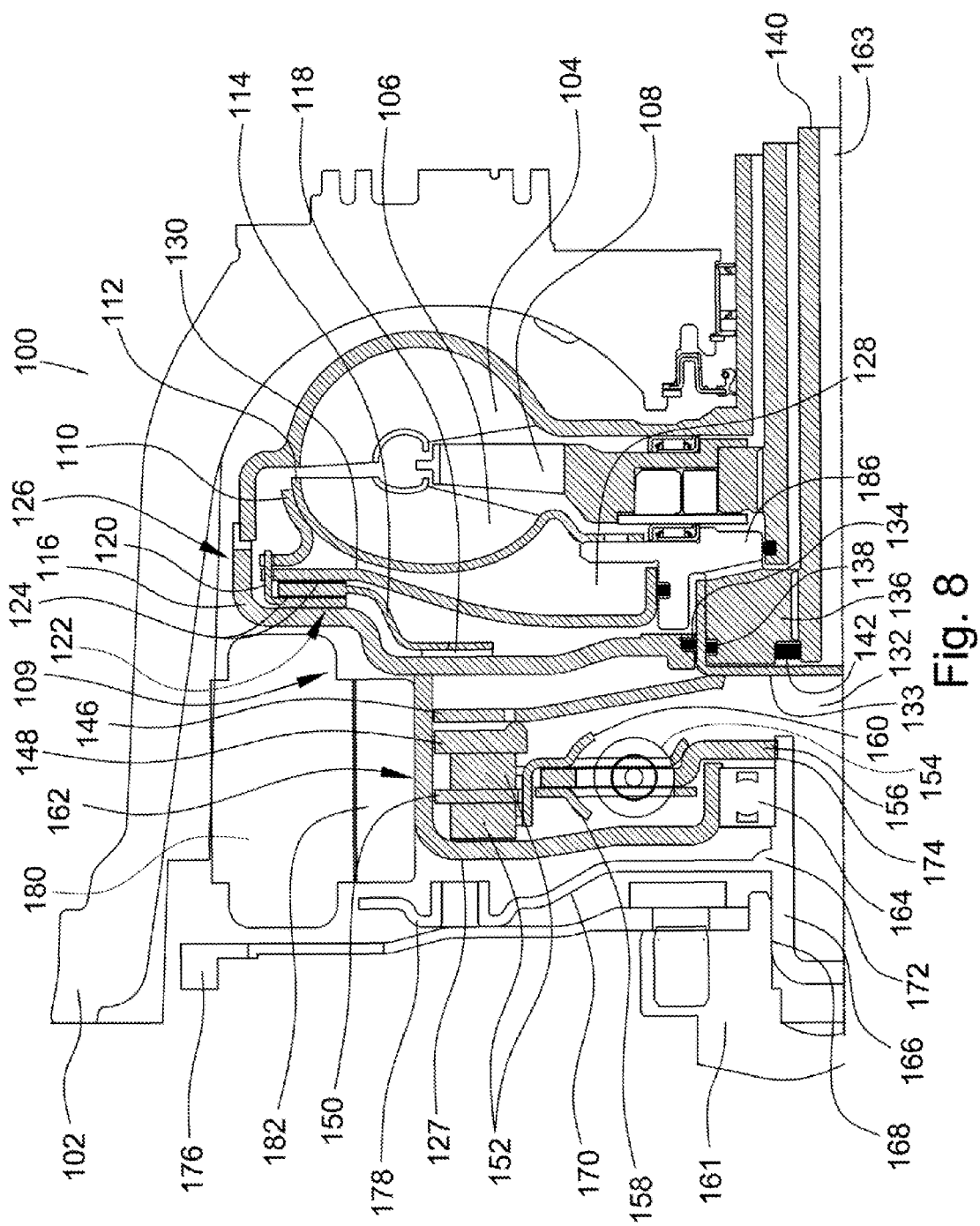
FIG. 8 is a partial cross-sectional view of a present invention hydrodynamic coupling device.

FIG. 8 is a partial cross-sectional view of present invention hydrodynamic coupling device 100. In a preferred embodiment, device 100 is used for hybrid applications, for example, inside a transmission housing, such as housing 102. Hydrodynamic coupling 100 includes pump 104, turbine 106, and stator 108. The pump and the turbine are in fluid communication as is known in the art and in disposed in housing 109. Drive plate 110 is fixed to turbine shell 112. Clutch plate 114 is drivingly engaged, or rotationally connected to, to sealing plate 116 with spring 118. By rotationally connected, or secured, we mean that the plates are connected such that the two components rotate together, that is, the two components are fixed with respect to rotation. Rotationally connecting two components does not necessarily limit relative movement in other directions. For example, it is possible for two components that are rotationally connected to have axial movement with respect to each other via a spline connection. However, it should be understood that rotational connection does not imply that movement in other directions is necessarily present. For example, two components that are rotationally connected can be axially fixed one to the other. The preceding explanation of rotational connection is applicable to the discussions infra. Stated another way, spring 118 drivingly engages plate 114 and plate 116, transferring torque from plate 116 to plate 114. Plates 110, 114, and 118 are rotationally connected through axial extension 120 of clutch plate 122, for example, through respective spline connections. Plates 110, 114, 116, 118 and 122 and friction surfaces 124 form clutch assembly 126. In one embodiment, plate 116 forms a portion of housing 109 and is fixedly secured to cover 127. In some aspects, plate 116 is attached to cover 127 by welding.

Multiple friction surfaces 124 provide increased torque capacity for torque converter clutch assembly 126. High pressure in chamber 128 urges piston plate 130 towards plate 116, closing the clutch and resulting in torque transmission from plate 116 to piston 130. In one embodiment, clutch assembly 126 includes three surfaces driven by plate 116, resulting in three times the torque capacity of a single plate design.

Sealing plate 116 creates a portion of dry chamber 132 in hydrodynamic coupling assembly 100. Plate 116 is also sealed to piston cup 133 with static seal 134. Advantageously, seal 134 need not be a dynamic seal because plate 116 and cup 133 are designed in such a manner that there is no relative rotation between the two components. That is, during operation of device 100, plate 116 and cup 133 are rotationally fixed. In one embodiment, seal 134 is a traditional o-ring type similar to those found in hydraulic cylinders, which is less likely to leak when compared with a dynamic seal. This is important because seal 134 retains transmission oil within coupling device 100, preventing oil leakage from the vehicle.

Cup 133 is sealed to turbine hub 136 with dynamic seal 138. Seal 138 and hub 136 are sealed to transmission input shaft 140 with seal 142. Seals 138 and 142 cause pressure changes in chamber 132 to displace piston cup 133, while seal 134 seals cup 133 to plate 116.

Spring 146 is axially aligned with cup 133. Pressure plate 148 and drive plate 150 are drivingly engaged with cover 127, i.e., by a spline connection (not shown). Friction plates 152 are drivingly engaged with pressure plate, the drive plate, and cover 127; and also are engaged with spring 154 and flange 156. Cover plate 158 is fixedly attached to cover plate 160, i.e., by rivets (not shown). Pressure plate 148, drive plate 150, and friction plates 152 form clutch pack 162. Use of spring 146 compensates for wear of friction material on friction plates 152, reducing variation in axial displacement of piston cup 133 to ensure proper alignment with seals 134 and 142.

Cover 127 is centered relative to engine crankshaft 161 through bearing 164 and pilot shaft 166. Outer diameter 168 of pilot shaft 166 is centered in crankshaft 161. Pilot shaft 166 is fixedly attached to lug plate 170, i.e., by weld 172 and drivingly engaged with flange 156, i.e., by spline 174. Flexplate 176 transmits torque from crankshaft 161 to lug plate 170 through bolts (not shown) engaged with lugs 178.

Electric motor stator 180 is fixedly attached to transmission housing 102 and rotor 182 is fixedly attached to cover 127.

As is described below, device 100 lends itself to a number of operational modes. For instance, a vehicle (not shown) in which device 100 is installed may be propelled by the electric motor alone through either the torque converter or through the torque converter clutch. Likewise, an engine (not shown) in the vehicle may be used to propel the vehicle through the torque converter or clutch. Also, both the engine and electric motor may be used simultaneously to propel the vehicle. During coasting or if the engine is turned off, the engine may be disconnected from the transmission, allowing increased efficiency for regenerative braking with the electric motor.

During operation, clutch pack 162 is used to engage and disengage the engine from the transmission. Low pressure in chamber 163 and force from spring 146 causes piston cup 133 to move towards pump 104, disengaging clutch 162 and interrupting torque transmission between crankshaft 161 and cover 127. Therefore, assembly 100 is free to rotate without restriction from the non-electric engine (not shown).

Electric motor rotor 180 is drivingly engaged with, for example, fixedly secured to, cover 127, so rotation of the electric motor spins cover 127 and pump 104. Rotation of pump hub 186 by pump 104 causes transmission oil pump (not shown) to produce pressure. Operation of hydrodynamic circuit between pump 104, turbine 106, and stator 108 propels the vehicle. When a direct connection is desired, increased pressure in chamber 128 engages torque converter clutch 126. Engagement of clutch 162 allows starting of the engine from the electric motor.

When operation in engine mode is desired, high pressure in chamber 163 causes piston cup 133 to displace towards cover 127. Displacement of piston cup 133 urges spring 146 towards cover 127, compressing clutch pack 162 to transmit torque from pilot shaft 166 to cover 127. Torque converter and torque converter clutch mode are achieved as described in electric motor mode above. Seals 134, 138, and 142 prevent fluid communication between chambers 128 and 132, so clutch 126 and clutch 162 operate without influence from the other. Also, the electric motor can be used in conjunction with the engine for increased power to propel the vehicle.

Figure 9:
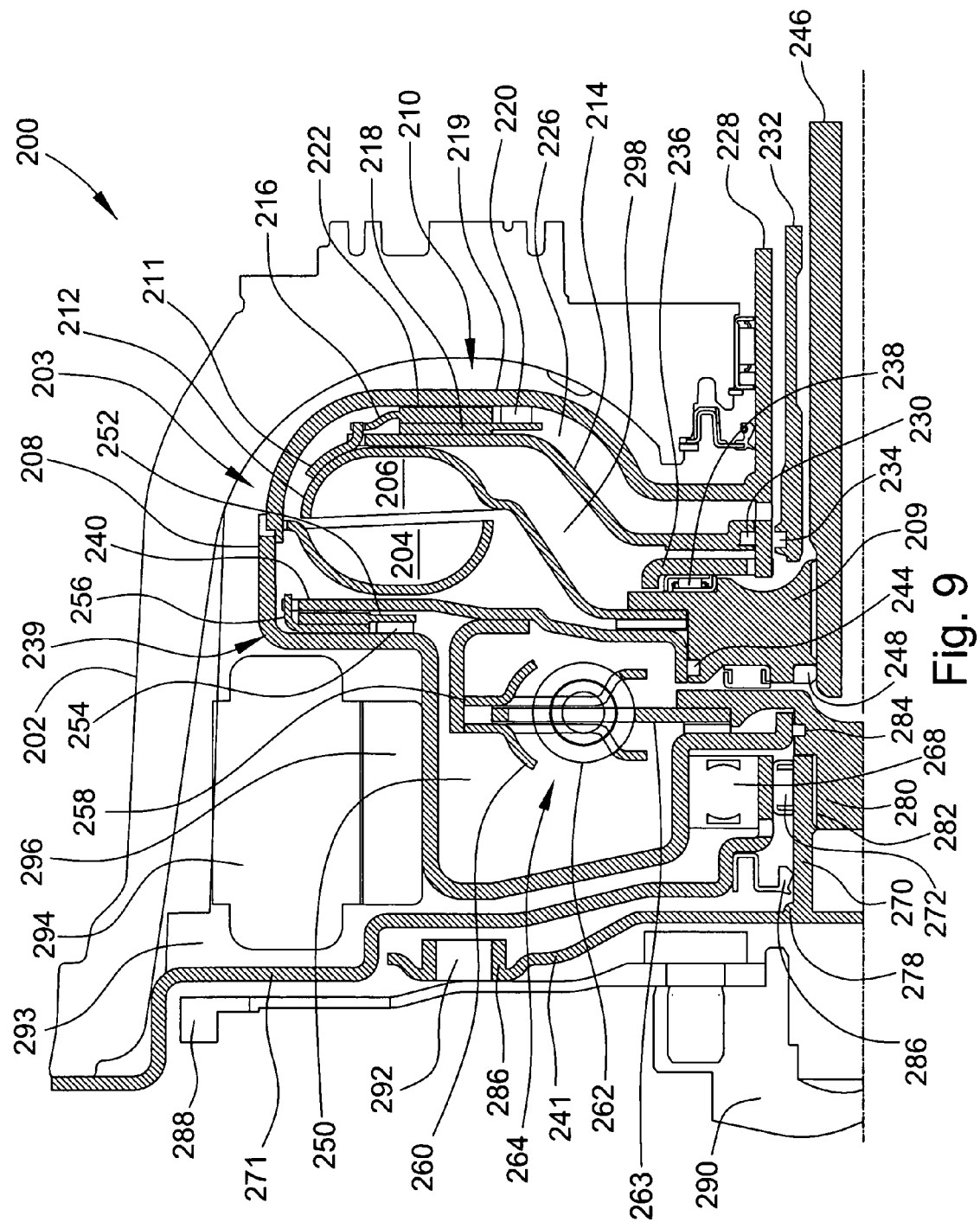
FIG. 9 is a partial cross-sectional view of a present invention hydrodynamic coupling device; and, FIG. 10 is a partial cross-sectional view of a present invention hydrodynamic coupling device.

FIG. 9 is a partial cross-sectional view of present invention hydrodynamic coupling device 200. In a preferred embodiment, device 200 is used for hybrid applications, for example, inside a transmission housing, such as housing 202. Hydrodynamic coupling 200 includes fluid coupling 203 with pump 204 and turbine 206. The pump and the turbine are in fluid communication as is known in the art. Pump 204 is rotationally connected to cover 208 and turbine 206 is rotationally connected to output hub 209.

Clutch 210 is rotationally connected to the housing and the turbine and includes drive tab 211, fixed to turbine shell 212. Piston plate 214 is drivingly engaged with, or rotationally connected to (hereinafter the terms are used interchangeably), drive tab 211. Piston drive plate 216 is drivingly engaged with piston 214 through drive tab 211. Cover drive plate 218 is drivingly engaged with shell 219 through leaf spring 220. Multiple friction surfaces 222 provide increased torque capacity for torque converter clutch assembly 210. Low pressure in chamber 226 urges piston plate 214 towards shell 212, resulting in torque transmission from shell 212 to piston 214 and drive plate 216, and through to tab 210. In one embodiment, clutch assembly 210 includes three surfaces driven by cover 208, resulting in three times the torque capacity of a single plate design.

Piston plate 214 is sealed to pump hub 228 with dynamic seal 230. Hub 228 is sealed to shaft 232 with dynamic seal 234. Flange 236 extends from pump hub 228 to axially retain bearing 238 on the hub.

Clutch 239 is disposed in a torque path from lug plate 241 to cover 208. Clutch 239 includes piston plate 240, sealed to turbine, or output, hub 209 with dynamic seal 244. Hub 209 is sealed to transmission input shaft 246 with seal 248. Seals 244 and 248 cause pressure changes in chamber 250 to displace piston 240.

Cover drive plate 252 is drivingly engaged with cover 208 through leaf spring 254. Friction plate 256 is drivingly engaged with piston plate 240, which is in turn engaged with cover plates 258 and 260, spring 262 and flange 263. Cover plate 260 is fixedly attached to cover plate 258, i.e., by rivets (not shown). Piston plate 240, drive plate 252 and friction plate 256 form clutch pack 239. The cover plates, spring 262, and the flange form damper 264, which is in the torque path from lug plate 241 to cover 208.

Cover 208 is centered relative to transmission housing 202 through bearing 268 and centering plate 241, while pilot shaft 270 is centered to centering plate 271 through bearing 272. Pilot shaft 270 is fixedly attached to lug plate 276, i.e., by weld 278, and drivingly engaged with flange 280, i.e., by spline 282. Flange 280 is sealed to cover 208 with dynamic seal 284, while seal 286 between centering plate 271 and pilot shaft 270 provides additional sealing to prevent oil from exiting assembly 200. Flexplate 288 transmits torque from crankshaft 290 to lug plate 276 through bolts (not shown) engaged with lugs 292.

Centering plate 271 seals transmission housing 202, so that oil used to cool the electric motor is retained. That is, chamber, or oil bath, 293 is formed, at least partially, by housing 202 and plate 271 and the oil is retained in the chamber. Centering plate 271 is attached to electric motor stator 294 and radially centers stator 294 relative to rotor 296. Electric motor stator 294 is fixedly attached to transmission housing 202 and rotor 296 is rotationally connected to cover 208.

As is described below, the inventive device lends itself to a number of operational modes. For instance, the vehicle may be propelled by the electric motor alone through either the fluid coupling or through the lockup clutch. Likewise, the engine may be used to propel the vehicle through the fluid coupling or clutch. Also, both the engine and electric motor may be used simultaneously to propel the vehicle. During coasting or if the engine is turned off, the engine may be disconnected from the transmission, allowing increased efficiency for regenerative braking with the electric motor.

During operation, chamber 298 is always charged with high pressure. Clutch pack 239 is used to engage and disengage the engine from the transmission. High pressure in chamber 250 removes apply force on piston 240, thereby disengaging clutch 239 and interrupting torque transmission between crankshaft 290 and cover 208. Therefore, assembly 200 is free to rotate without restriction from the engine.

Electric motor rotor 296 is drivingly engaged with cover 208, so rotation of electric motor spins cover 208, pump shell 212, and pump 204. Rotation of pump hub 228 by pump shell 212 causes transmission oil pump (not shown) to produce pressure. Operation of the hydrodynamic circuit between pump 204 and turbine 206 propels the vehicle. When a direct connection is desired, decreased pressure in chamber 226 engages lockup clutch 210. Engagement of clutch 239 enables starting of the engine from the electric motor.

When operation in engine mode is desired, low pressure in chamber 250 causes piston 240 to displace towards cover 208. Displacement of piston 240 compresses clutch pack 239 to transmit torque from pilot shaft 270 to cover 208. Fluid coupling and lockup clutch mode are achieved as described in electric motor mode above. Seals 244, 230, 234, and 248 prevent fluid communication between chambers 226 and 250, so clutch 210 and clutch 239 operate without influence from the other. That is, respective pressures in chambers 226 and 250 are independently controllable to operate clutches 210 and 239. Alternately stated, chambers 226 and 250 are in fluid isolation, for example, due to the seals noted above. Also, the electric motor can be used in conjunction with the engine for increased power to propel the vehicle.

Figure 10:
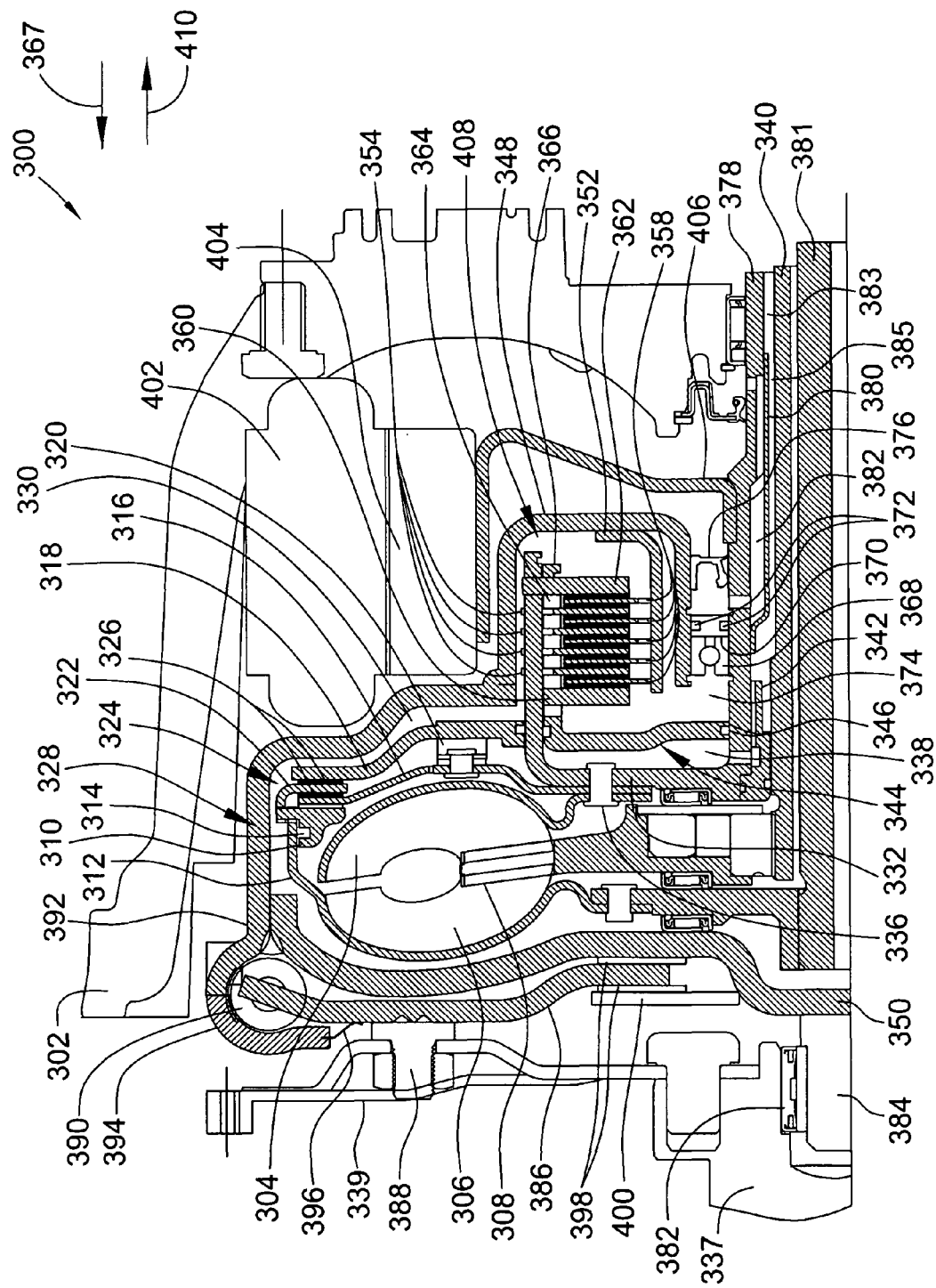

FIG. 10 is a partial cross-sectional view of present invention hydrodynamic coupling device 300. In a preferred embodiment, device 300 is used for hybrid applications, for example, inside a transmission housing, such as housing 302. Hydrodynamic coupling 300 includes pump 304, turbine 306, and stator 308. Pressure plate 310 is sealed to turbine shell 312 by seal (not shown) disposed in groove 314. Piston drive plate 316 is drivingly engaged with piston 318 through leaf spring 320. Pressure plate 310 is drivingly engaged with turbine shell 312 and clutch plate 322 at toothed connection 324. Multiple friction surfaces 326 provide increased torque capacity for torque converter clutch assembly 328. High pressure in chamber 330 urges piston plate 318 towards shell 312, resulting in torque transmission from piston 318 and drive plate 316 to turbine 306, that is, clutch 328 is closed. Outer carrier 332 is drivingly engaged with drive plate 316 and pump 304 through rivet 336. On some aspects, clutch assembly 328 includes three surfaces driven by outer carrier 332, resulting in three times the torque capacity of a single plate design.

Outer carrier 332 partially encloses chamber 338 in hydrodynamic coupling assembly 300. Carrier 332 is sealed to stator shaft 340 in a fluid-tight manner. In some aspects, carrier 332 is sealed to shaft 340 by sealing tube 342. Carrier 332 is also sealed to piston 344 with seals 346. Therefore, piston 344 also forms a portion of chamber 338. Seals 346 allow pressure changes in chamber 338 to displace piston 344.

Housing 348 is fixedly attached to cover 350. Inner carrier 352 is attached to housing 348 and splined to clutch plates 354. Plates 354 are disposed between adjacent pairs of clutch plates 358 and drivingly engaged with outer carrier 332. End plate 360 and backing plate 362 are disposed adjacent end plates 358. Piston 344 includes axial protrusion 364 extending through plates 354, 360, and 362, and radial protrusion 366 disposed at a distal end of axial protrusion 364. Radial protrusion 366 is arranged to exert force on backing plate 362 when piston 344 moves in direction 367. Force on plate 362 compresses plates 358 and 354 against end plate 360 to engage the clutch.

Outer carrier 332 is centered relative to housing 348 by bearing 368. Housing 348 is sealed to carrier 332 by sealing ring 370. Ring 370 incorporates seals 372. At least one of seals 372 is a dynamic seal. Some fluid leakage may be expected past dynamic seal 372 when high pressure is present in chamber 374, so dynamic seal 376 is provided to further seal housing 348. Pump hub 378 is fixedly attached to carrier 332.

Hub 378 includes sleeve 380, sealed to hub 378 and partially enclosing channel 382 to drain fluid trapped between seals 362 and 366. Sleeve 380 advantageously creates a fourth fluid channel without boring additional holes in input shaft 381. Although sleeve 380 is shown in device 300, it should be understood that sleeve 380 can be used in any hydrodynamic coupling device having a space formed by a stator shaft and a pump hub to divide the space into two channels. For example, in FIG. 10, the sleeve divides space 383 between stator shaft 340 and hub 378 into channels 382 and 385. In device 300, channel 385 provides fluid pressure to chamber 336.

Cover 350 is centered relative to engine crankshaft 337 through bearing 382 and pilot 384. Flexplate 339 transmits torque from crankshaft 337 to flange 386 through studs 388. Torque from flange 386 is transmitted to cover 350 through springs 390. Cover 350 comprises segments 392 and 394 which are joined (i.e., by welding) after spring 390 is installed. In one embodiment, segments 392 and 394 are joined by laser welding. Spring 396 applies an axial force to flange 386. Friction rings 398 are held in contact with flange 386 by plate 400 and cover 350.

Electric motor stator 402 is fixedly attached to transmission housing 302 and rotor 404 is rotationally connected to drive ring 406. Drive ring 406 is drivingly engaged with pump hub 378 and carrier 332. Bearing 368 centers rotor 404 relative to housing 348.

As is described below, the inventive device lends itself to a number of operational modes. For instance, the vehicle may be propelled by the electric motor alone through either the torque converter or through the torque converter clutch. Likewise, the engine may be used to propel the vehicle through the torque converter or clutch. Also, both the engine and electric motor may be used simultaneously to propel the vehicle. During coasting or if the engine is turned off, the engine may be disconnected from the transmission, allowing increased efficiency for regenerative braking with the electric motor.

During operation, clutch pack 408 is used to engage and disengage the engine from the transmission. High pressure in chamber 338 causes piston 344 to move in direction 410, disengaging clutch 408 and interrupting torque transmission between crankshaft 337 and pump 304.

Electric motor rotor 404 is drivingly engaged with carrier 332, so rotation of electric motor spins carrier 332 and pump 304. Rotation of pump hub 378 causes transmission oil pump (not shown) to produce pressure. Operation of hydrodynamic circuit between pump 304, turbine 306, and stator 308 propels the vehicle. When a direct connection is desired, increased pressure in chamber 330 engages torque converter clutch 328 to drivingly engage pump 304 and turbine 306. Engagement of clutch 408 allows starting of an non-electric engine (not shown) from the electric motor.

When operation in engine mode is desired, pressure in chamber 338 is reduced. Charge pressure in chamber 374 causes piston 344 to displace in direction 367. Protrusion 366 exerts axial force on backing plate 362, compressing clutch pack 408 to transmit torque from housing 348 to carrier 332. Torque converter and torque converter clutch mode are achieved as described in electric motor mode above. Seals 346 and sealing tube 342 prevent fluid communication between chambers 330 and 338, so clutch 328 and clutch 408 operate without influence from the other. That is, respective pressures in chambers 330 and 338 are independently controllable to operate clutches 328 and 408. Alternately stated, chambers 330 and 338 are in fluid isolation, for example, due to the seals noted above. Also, the electric motor can be used in conjunction with the engine for increased power to propel the vehicle.

The present invention also includes a method for operating a hydrodynamic coupling device including a housing, an electric motor rotationally connected to the housing, a pump disposed in the housing, a turbine disposed in the housing and including a turbine shell, and a clutch rotationally connected to a housing and the pump. Although the method is depicted as a sequence for clarity, no order should be inferred from the sequence unless explicitly stated. A first step divides a spaced formed between a stator shaft and a pump hub into first and second separate channels. A second step controls fluid pressure in a fluid chamber for the clutch via the first channel. A third step drains fluid between seals for the fluid chamber via the second channel.

The present invention also includes a method for assembling a hydrodynamic coupling device. Although the method is depicted as a sequence for clarity, no order should be inferred from the sequence unless explicitly stated. A first step rotationally connects an electric motor rotationally connected to a housing. A second step disposed a pump and a turbine in the housing. A third step disposes first and second clutches in the housing. The first clutch connects the housing and the pump and the second pump connects the turbine and the housing. A fourth step connects a cover to the housing. A fifth step disposes a damper spring and flange in a space formed by the housing and the cover. A sixth step fixedly secures a plate to the cover such that the plate retains the spring with respect to the cover and the housing.

Thus, it is seen that the objects of the invention are efficiently obtained, although changes and modifications to the invention should be readily apparent to those having ordinary skill in the art, without departing from the spirit or scope of the invention as claimed. Although the invention is described by reference to a specific preferred embodiment, it is clear that variations can be made without departing from the scope or spirit of the invention as claimed.

What I claim is:

1. A hydrodynamic coupling device comprising:
   a cover;
   a housing;
   a sealing plate rotationally connected to the housing;
   a pump disposed within the housing;
   a turbine disposed within the housing and in fluid communication with the pump;
   a dry chamber at least partially enclosed by the housing and the sealing plate;
   a first clutch disposed in the dry chamber, including a diaphragm spring, and arranged to drivingly engage the cover to a pilot shaft; and,
   a piston cup at least partially enclosing the dry chamber and arranged to displace the diaphragm spring to control operation of the first clutch.

2. The coupling device of claim 1, further comprising a damper, wherein the damper is disposed in the dry chamber.

3. The coupling device of claim 1, further comprising a torque converter including the pump and the turbine.

4. The coupling device of claim 1, further comprising an electric motor with a rotor connected to the housing.

* * * * *